United States Patent [19]

Feldman et al.

[11] Patent Number: 4,559,211

[45] Date of Patent: Dec. 17, 1985

[54] METHOD FOR REDUCED TEMPERATURE OPERATION OF FLUE GAS COLLECTORS

[75] Inventors: Paul L. Feldman; Robert J. Gleason, both of Somerville, N.J.

[73] Assignee: Research-Cottrell, Inc., Somerville, N.J.

[21] Appl. No.: 599,792

[22] Filed: Apr. 13, 1984

Related U.S. Application Data

[63] Continuation-in-part of Ser. No. 520,620, Aug. 5, 1983, abandoned.

[51] Int. Cl.$^4$ .......................... C01B 17/00; B01J 8/00
[52] U.S. Cl. .................................... 423/242; 423/244; 55/97
[58] Field of Search ........... 423/242 R, 242 A, 244 R, 423/244 A; 55/97

[56] References Cited

U.S. PATENT DOCUMENTS

| | | | |
|---|---|---|---|
| 1,329,737 | 2/1920 | Wolcott | 55/10 |
| 1,329,818 | 2/1920 | Wolcott | 55/8 |
| 2,718,453 | 9/1955 | Beckman | 423/555 |
| 3,481,289 | 12/1969 | Oda et al. | 110/1 |
| 3,520,649 | 7/1970 | Tomany et al. | 23/2 |
| 3,523,407 | 8/1970 | Humbert | 55/106 |
| 3,709,977 | 1/1973 | Villers-Fisher | 423/244 |
| 3,833,711 | 9/1974 | Villers-Fisher | 423/244 |
| 3,929,968 | 12/1975 | Taub | 423/242 |
| 3,976,747 | 8/1976 | Shale et al. | 423/244 |
| 4,185,080 | 1/1980 | Rechmeier | 423/242 |
| 4,208,383 | 6/1980 | Kisters et al. | 423/215.5 |
| 4,309,393 | 1/1982 | Nguyen | 423/244 |
| 4,519,995 | 5/1985 | Schrofelbauer et al. | 423/244 |

Primary Examiner—Gregory A. Heller
Attorney, Agent, or Firm—Kerkam, Stowell, Kondracki and Clarke

[57] ABSTRACT

A method for reduced temperature operation of flue gas collectors is disclosed wherein the benefits of low temperature operation are made possible by avoidance of the acid dewpoint limit. The process increases the specific collecting area of the collector, results in lower pressure drop through the collector and, where the collector is an electrostatic precipitator, allows improved collection efficiency through higher electric field strength and reduced particulate resistivity.

1 Claim, 2 Drawing Figures

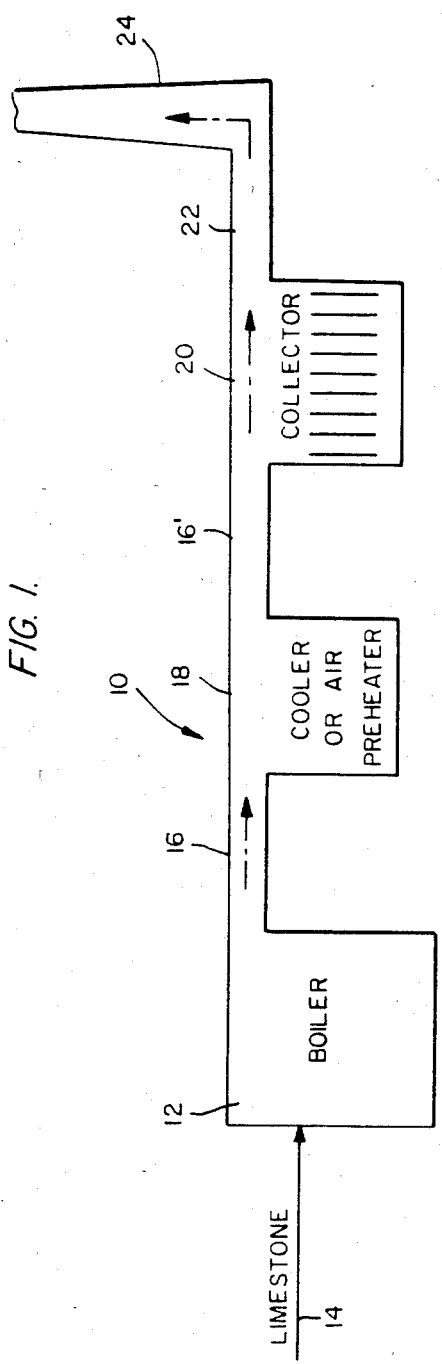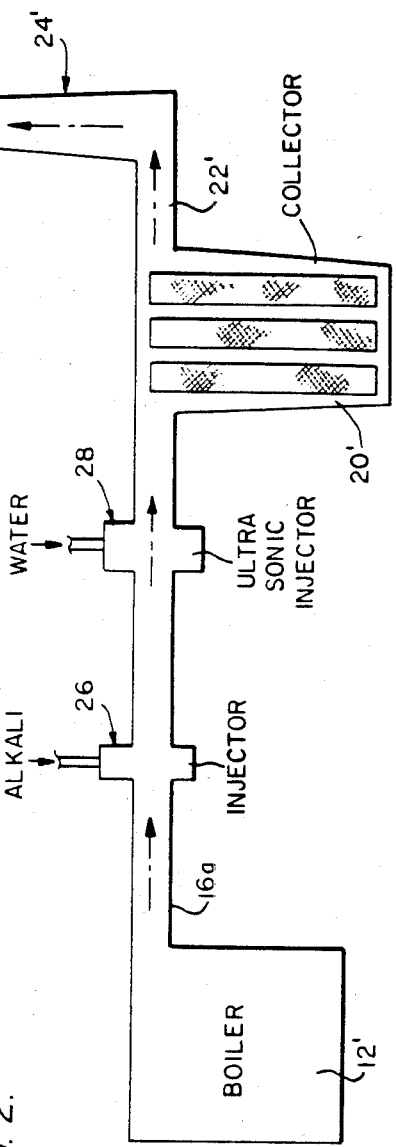

METHOD FOR REDUCED TEMPERATURE OPERATION OF FLUE GAS COLLECTORS

RELATED APPLICATION

This application is a continuation-in-part of application Ser. No. 520,620 filed Aug. 5, 1983 now abandoned.

BACKGROUND OF THE INVENTION

For the high efficiency collection of fly ash from coal-fired boilers, electrostatic precipitators and fabric filters are almost exclusively used. In this application they generally operate at temperatures greater than 250° F., with 300° F. being typical. Although lower temperature operation would be advantageous for both energy efficiency and equipment size, this is normally not possible because of the sulfuric acid dewpoint; if flue gas is cooled below the acid dewpoint, an acid mist forms which subsequently attacks the downstream equipment. In coal fired boiler applications, the acid dewpoint is determined by the concentration of sulfur trioxide in the flue gas, which may be in the range of 5 to 30 ppm.

It is known to treat flue gases with an alkali by injecting, for example, calcium compounds into the flue gas or into the boiler and examples of patents disclosing such are:

| | |
|---|---|
| 3,481,289 | Oda et al |
| 3,520,649 | Tomany et al. |
| 4,185,080 | Rechmeier |
| 4,309,393 | Nguyen |

It is also known to treat flue gases by lowering the gas temperature via water injection or boiler preheaters or both and examples of patented art relevant thereto are:

| | |
|---|---|
| 1,329,737 | Wolcott |
| 1,329,818 | Wolcott |
| 3,523,407 | Humbert |
| 4,208,383 | Kisters et al. |

BRIEF SUMMARY OF THE INVENTION

The invention may be generally summarized as a method for reduced temperature operation of flue gas collectors which includes treating the combustion system or the hot flue gas with an alkali in an amount at least sufficient to prevent the formation of or remove the sulfur trioxide prior to the particulate collector. With the elimination or substantial reduction of sulfur trioxide, the flue gas is cooled to a temperature less than about 250° F. and preferably to about 140° F. to about 150° F. After the flue gas has been treated and cooled, the flue gas is subjected to particulate collection in, for example, an electrostatic precipitator or bag filter.

BRIEF DESCRIPTION OF THE DRAWING

The invention will be more particularly described in reference to the accompanying drawing wherein:

FIG. 1 is a diagrammatic view of a system for low temperature collection of particulates from flue gases; and FIG. 2 is a diagrammatic view similar to that illustrated in FIG. 1 of a modified system for low temperature collection of particulates in flue gases.

DETAILED DESCRIPTION OF THE INVENTION

Elimination of sulfur trioxide removes the acid dewpoint problem of flue gases containing sulfur trioxide and allows further cooling of typical fossil-fuel generated gas well below 250° F., to preferably the range of 140° F. to 150° F. This cooling can be accomplished through an enlarged air preheater, thereby increasing the thermal efficiency of the plant, or by evaporative cooling through water injection into the flue gas. The latter method is more appropriate to the retrofit situation and has additional advantages from the standpoint of performance of the elctrostatic precipitator or fabric filter.

Specifically, the benefits of lower-temperature and higher-moisture operation of an electrostatic precipitator or fabric filter are the following:

For the electrostatic precipitator:
1. Lower temperature results in lower volumetric flow through the precipitator, which in turn increases the specific collecting area of the precipitator (SCA); i.e., the collecting area per unit volume of flow. Precipitator collection efficiency is directly dependent on SCA through an exponential relationship.
2. Lower volumetric flow results in lower pressure drop through the system and consequent energy savings.
3. Lower temperature results in higher gas density, which in turn allows a correspondingly higher electric field strength to be applied in the precipitator. This results in improved collection efficiency.
4. Lower temperature combined with higher moisture results in moderate resistivity of the fly ash. Thus, if the resistivity at the initial higher temperature were high, causing inefficient precipitator operation, evaporative cooling would yield further collection efficiency increase through resistivity moderation.

For the fabric filter:
1. Lower temperature results in lower volumetric flow through the filter bags; i.e., a reduction in air-to-cloth ratio, which results in energy savings through pressure drop reduction.
2. In addition to the volume reduction, the lower temperature causes a reduction in gas viscosity, which for flow through filter bags results in direct reduction of pressure drop.
3. The lower flow rate through the filter bags has the effect of increasing bag life and reducing penetration.
4. Increasing moisture content of flue gas affects the porosity of the filter cake and consequently causes significant reduction in pressure drop through the filter.

As an example of the effect of this concept on electrostatic precipitation, consider a precipitator operating at 300° F. at a collection efficiency of 99%. By cooling the gas stream to 150° F. by evaporative cooling, the volume is reduced by 14% (including the added water vapor volume), resulting in a SCA increase of 16%. This SCA effect alone increases the collection efficiency to 99.3%. The additional effect of increased field strength allows a further increase in efficiency. Theoretically, the field strength may be increased by 18%, which would result in a collection efficiency of 99.8%. Even with only a 10% increase in field strength over the base case, the new efficiency is 99.6%. These examples represent a significant reduction in outlet emissions by application of this concept; e.g., emissions at 99.8% efficiency are only one-fifth those at 99% efficiency.

The above example assumed that the 300° F. base operation was at moderate resistivity. If the resistivity were high, even greater comparative benefits would have resulted by applying evaporative cooling because of the additional beneficial effect of resistivity reduction at the lower temperature.

Application of this concept has more practical value than simply increasing precipitator efficiency. It is also important in situations where precipitator efficiency is to be maintained when particulate concentration is expected to increase, when resistivity is expected to increase, or when an increase in capacity of the plant is anticipated.

An example of the value of this concept as applied to fabric filtration follows: consider a fabric filter operating at 300° F. with a pressure drop of 6 inches of water. Evaporative cooling to 150° F. reduces the gas volume by 14% and also reduces gas viscosity by 14%. In flow through a fabric, pressure drop is directly proportional to both flow rate and viscosity. Therefore, the resultant pressure drop reduction is 26%. In terms of energy savings the reduction is even greater because energy is a function of both pressure drop and flow rate. In this case the savings in energy due to cooling alone is 36%. As noted before, there is an additional energy savings due to reduced pressure drop resulting from the effect of humidity on the porosity of the filter cake. In this example the relative humidity increases from about 2% to 55%. This level of humidity increase can effect a 40% reduction in pressure drop. Adding this effect to the energy savings due to cooling alone results in a net energy savings over the base case of 62%.

There is no question that the potential advantages of this concept to either electrostatic precipitator or fabric filter operation are significant. The key to realizing these benefits lies in the ability to reduce the acid dewpoint of the flue gas so that cooling can occur without regard to acid condensation. A method of achieving this result is injection of an alkali compound in sufficient quantity to react with the sulfur trioxide at some point upstream of the fabric filter or electrostatic precipitator. Fortunately, sulfur trioxide is more reactive with alkali than other major components of the flue gas stream so that it is likely to be easily removed by this means.

Although at normal flue gas temperatures and lower, the equilibrium between sulfur trioxide and sulfur dioxide favors conversion of the dioxide to the trioxide, there is no danger of trioxide being regenerated after its removal by alkali and the gas temperature has been lowered because the rate of dioxide to trioxide conversion is extemely slow at low temperatures. Thus, in the time frame of gas flow through particulate collection equipment, if sulfur trioxide is removed, e.g. by alkali injection, it will not reappear through the mechanism of oxidation of the dioxide.

Examples of alkali which can be used to remove sulfur trioxide include calcium compounds such as lime or limestone; sodium compounds such as sodium carbonate or bicarbonate, Trona or Nahcolite; or ammonia. The calcium or sodium compounds can be injected either as finely divided solids or in slurry or solutions. The ammonia would be injected as gas. It is important that the alkali be injected in such quantities and at a point in the system where the temperature will not allow sulfur dioxide oxidation to exceed the alkali available for reaction with sulfur trioxide.

Another key to the successful implementation of this invention is the efficient disbursement of water for evaporation in those cases where evaporative cooling is used for temperature reduction. In the ideal case water would be sprayed into the existing flue ahead of the precipitator or fabric filter, requiring no new vessel or duct modification for the evaporative cooling effect. However, to realize this ideal, droplet size must be very fine so that complete evaporation occurs in the short time available before the particulate removal device, and so that large droplets do not drop out into the flue causing a wet zone.

It is believed that if droplets no larger than 50 microns in diameter are injected, complete evaporation would occur in less than one-half second, which should be satisfactory for most applications. Conventional spray nozzles cannot achieve this fine level of spray dispersion. However, ultrasonic nozzles can achieve and exceed this degree of dispersion. Therefore, through the use of ultrasonic nozzles it will be possible to apply the evaporative cooling method to most retrofit situations without the need for additions or major modifications to existing fluework. The option to the ultrasonic nozzle approach would be the addition of a spray vessel or expansion of the flue ahead of the precipitator to allow adequate time for droplet evaporation.

A suitable ultrasonic spray nozzle is manufactured and sold by Sono-Tek Corporation and designated Sono-Tek Ultrasonic Atomizing Nozzle.

There is a very important class of special cases to this invention. This is in situations where alkali is added upstream of the particulate collector for the purpose of sulfur dioxide control. Because sulfur dioxide is present in much larger quanitities in flue gas than sulfur trioxide and because it is less reactive than sulfur trioxide, the amount of alkali injected for sulfur dioxide control is much more than enough to completely remove the sulfur trioxide. Therefore in any of these processes, the flue gas to the precipitator or fabric filter can be cooled without regard for an acid dewpoint.

The most significant of these special cases are fluidized bed combustion, dry-sodium injection, and boiler limestone injection. With fluidized bed combustion, coal is burned in a fluidized bed of alkali material, e.g. dolomite. The bed temperature is low compared to conventional combustion so that nitrogen oxide emissions are reduced in addition to the removal of much of the sulfur dioxide by reaction with the alkali.

Dry-sodium injection is simply the injection of a powdered sodium compound such as Trona or Nahcolite ahead of the particulate collector for the purpose of reacting with and removing sulfur dioxide. It is also known that there is significant removal of sulfur dioxide by injection of sodium compounds between the air preheater and a fabric filter and therefore it is expected that injection of alkali at that point would be most effective in removing sulfur trioxide.

The third process, boiler limestone injection, is probably the most significant for the purpose of both sulfur dioxide and nitrogen oxide control in retrofit application to coal-fired boilers. As such, it is very important in plans for implementation of acid rain controls. However, the use of boiler limestone injection aggravates the operation of the downstream precipitator by increasing the particulate resistivity and the particulate loading to the precipitator. Application of the method of this invention can be key to the practical use of boiler limestone injection in retrofit situations.

The mechanism by which boiler limestone injection is effective in $SO_2$ removal is the reaction of the injected limestone with the $SO_2$ to form calcium sulfite, which then further oxidizes to calcium sulfate. About 50% of $SO_2$ removal can be achieved in presently conceived systems. The calcium compounds are carried in the flue gas as entrained particulate and are collected downstream along with the fly ash in the particulate collecting device. In virtually all retrofit situations where this might be implemented, the particulate collector is an electrostatic precipitator.

$NO_x$ reduction by about 50% is achieved in presently conceived boiler limestone injection processes because of staged combustion which results in lower flame temperature than normal combustion.

The ideal retrofit situation would be the installation of boiler limestone injection to achieve required $SO_2$ and $NO_x$ reduction with no further equipment additions or changes in the power generating plant. However, because of the limestone injected in the process and its subsequent reaction products, the particulate loading to the downstream precipitator increases. This increase in loading may be by as much as a factor of two or three, depending on the sulfur content of the coal and the stoichiometry used. Because an electrostatic precipitator is a constant-efficiency type collector, an increase in inlet loading results in a corresponding increase in outlet emissions. Thus, a doubling of the inlet loading due to boiler limestone injection would result in a doubling of emissions from the precipitator (assuming the particulate size distribution is similar to fly ash).

This problem is further compounded by the fact that, because of the high incremental loading of calcium compounds, the resistivity of the particulate would increase in the precipitator, resulting in a degradation of precipitator efficiency. Typically, this degradation could be from 99% collection efficiency without boiler limestone injection to 95% with. This combined with the doubling of the precipitator inlet loading means a possible net increase in particulate emissions by a factor of ten. This is clearly intolerable.

A solution to this problem could be ash conditioning to reduce the particulate resistivity and addition of precipitator collecting area to accommodate the increased loading. This approach, however, destroys the simplicity of the boiler limestone injection approach, is expensive, and in many cases may be difficult or impossible to implement because of space limitations at specific plant sites.

The method of this invention relieves both problems of high resistivity and increased loading to the precipitator in a single process step of evaporative cooling of the flue gas prior to the precipitator. The degree of cooling necessary will depend on specific cases, but it is expected that in most cases cooling on the order of 150° F. will be required. The net result of the method is that boiler limestone injection can be implemented in retrofit situations for $SO_2$ and $NO_x$ control with no changes to downstream equipment except for the provision for humidification of the gas stream.

Following is an example showing how the method can be used in a retrofit boiler limestone injection situation to maintain particulate emission levels without requiring additional precipitator area.

Referring now to FIG. 1, 10 generally designates apparatus for carrying out the method of the present invention. The apparatus includes a boiler 12 which may be of the type having limestone injection at 14 or of the fluidized bed type wherein coal and limestone are injected into the bed. Flue gas containing particulates and sulfur and the reaction products of sulfur trioxide with the alkali material leaves the boiler via duct 16 and enters a cooler 18 which may be used to inject water into the flue gas. The flue gas cooled to at least below 250° F. flows from the cooler via conduit 16' and enters the collector 20. The collector 20 may be an electrostatic precipitator or bag filter of conventional design. The flue gas having the particulates removed therefrom is directed via conduit 22 to a stack 24.

Referring to FIG. 2, showing a modified form of the present invention, 12' is a coal fired boiler and the hot flue gases issue therefrom via conduit 16a. In the conduit 16a is an alkali injector section 26 wherein ground lime or limestone or sodium carbonate or bicarbonate or ammonia is injected into the gas stream. Following the alkali injection the gas stream is cooled by injection of water via an ultrasonic injector generally designated 28. The flue gas cooled below 250° F. is then passed to the particulate collector 20' which may be an electrostatic precipitator or bag filter of conventional construction. The gas stream having the particulates removed therefrom flows from the collector via duct 22' to a stack 24'.

EXAMPLE

Assume before retrofit the precipitator is well energized, collecting moderate resistivity ash, with an applied voltage of 43 KV. Its SCA is 200 (sq. ft./1000 scfm) and its collection efficiency is 99%. Flue gas temperature is 300° F. with moisture content of 8%. Particulate loading to the precipitator is 4 gr/scf with emissions of 0.04 gr/scf.

After retrofit, with lime or limestone injection, the particulate loading to the precipitator doubles to 8 gr/scf and its resistivity increases resulting in an operating voltage drop to 32 KV. The reduction in power results in a loss of collection efficiency to 95.3%. This efficiency loss coupled with the doubling of the inlet loading results in an increase of particulate emissions by a factor of 9.4 to 0.376 gr/scf. In order for the precipitator to maintain the previous emission level of 0.04 gr/scf, its efficiency would have to be increased to 99.5%. At the high resistivity condition, this would require increasing the precipitator size by a factor of 2.54 to an SCA of 508. This is clearly impractical in most retrofit situations. If gas conditioning is used to reduce the resistivity back to its original level and good electrical energization is restored, the precipitator will have to be increased by a factor of 1.27 to an SCA of 254 in order to maintain the emission level of 0.04 gr/scf. Although this is in the realm of possibility, the installation of gas conditioning and additional collecting area is expensive in capital cost and increases operating costs.

If instead, the method of the present invention is followed, the flue gas is cooled to 150° F. by evaporative cooling. Flue gas moisture content increases to 13%. At these conditions the resistivity of the particulate should be restored to the original moderate level. The gas volume, allowing for the additional moisture, is reduced by 14% so that the new precipitator SCA is 232. Furthermore, because of the increased gas density, in this case it is possible to increase the precipitator voltage by at least 10%. If we assume a voltage increase to 47 KV, the collection efficiency under these conditions becomes 99.6%, i.e., the particulate emission is actually decreased to 0.03 gr/scf. Even if the voltage is only increased to 45 KV, the precipitator efficiency is 99.5% corresponding to the original emission 0.04 gr/scf.

We claim:

1. A method for reduced temperature operation of flue gas particulate collection comprising eliminating sulfur trioxide from hot flue gas by treating the flue gas with an alkali material to thereby lower the acid dewpoint; thereafter cooling the flue gas top about 140° F. to about 250° F. and then subjecting the cooled flue gas to particulate gas to particulate collection, wherein the cooling of the flue gas is accomplished by evaporation of water injected as a spray of very fine droplets less than 50 microns in diameter into the flue gas downstream of the alkali treatment, wherein the alkali material is a finely divided compound selected from the group comprising lime, limestone, dolomite, sodium carbonate, sodium bicarbonate, Trona and Nahcolie and wherein the alkali material is injected as a solution or slurry.

* * * * *

UNITED STATES PATENT AND TRADEMARK OFFICE
CERTIFICATE OF CORRECTION

PATENT NO. : 4,559,211

DATED : December 17, 1985

INVENTOR(S) : FELDMAN et al

It is certified that error appears in the above-identified patent and that said Letters Patent is hereby corrected as shown below:

Column 8, Claim 1, line 1, "top" should be --to--.
Column 8, Claim 1, line 3, "to particulate gas" should be omitted.

Signed and Sealed this

Fifteenth Day of December, 1987

Attest:

DONALD J. QUIGG

*Attesting Officer*     *Commissioner of Patents and Trademarks*